United States Patent
Wallace et al.

(10) Patent No.: US 12,215,833 B2
(45) Date of Patent: Feb. 4, 2025

(54) ENHANCED CONTRAST FACE PLATE SYSTEM, KIT, AND METHOD

(71) Applicants: Natalie Wallace, La Mesa, CA (US); Bret Tollgaard, La Mesa, CA (US)

(72) Inventors: Natalie Wallace, La Mesa, CA (US); Bret Tollgaard, La Mesa, CA (US)

( * ) Notice: Subject to any disclaimer, the term of this patent is extended or adjusted under 35 U.S.C. 154(b) by 0 days.

(21) Appl. No.: 18/355,457

(22) Filed: Jul. 20, 2023

(65) Prior Publication Data

US 2024/0027033 A1    Jan. 25, 2024

Related U.S. Application Data

(60) Provisional application No. 63/390,771, filed on Jul. 20, 2022.

(51) Int. Cl.
| | | |
|---|---|---|
| *H01R 13/514* | (2006.01) | |
| *F21K 9/275* | (2016.01) | |
| *F21Y 105/18* | (2016.01) | |
| *H01R 13/717* | (2006.01) | |

(52) U.S. Cl.
CPC ........... *F21K 9/275* (2016.08); *H01R 13/514* (2013.01); *H01R 13/717* (2013.01); *F21Y 2105/18* (2016.08)

(58) Field of Classification Search
CPC ..... F21K 9/275; H01R 13/514; H01R 13/717; F21Y 2105/18; H02G 3/14; H02G 3/081; H01H 9/18
See application file for complete search history.

(56) References Cited

U.S. PATENT DOCUMENTS

| | | | |
|---|---|---|---|
| 4,833,277 A | 5/1989 | Jacoby, Jr. et al. | |
| 6,183,101 B1 * | 2/2001 | Chien | G04B 19/30 362/84 |
| 6,423,900 B1 * | 7/2002 | Soules | H01R 24/78 |
| 6,547,411 B1 * | 4/2003 | Dornbusch | F21S 8/035 362/85 |
| D476,549 S | 7/2003 | Shaw | |
| 7,036,948 B1 * | 5/2006 | Wyatt | H01R 13/6683 362/276 |
| 8,393,747 B2 | 3/2013 | Kevelos et al. | |
| 8,770,424 B1 * | 7/2014 | Shaw | H02G 3/14 220/242 |
| 8,912,442 B2 | 12/2014 | Smith | |
| 8,994,540 B2 | 3/2015 | Fadell et al. | |

(Continued)

OTHER PUBLICATIONS

Aidacare, "Dementia Care Glowing Surround for Light Switch", webpage, aidacare.com.au, Item Code: 05_098800044_0103_1_2, Australia. https://www.aidacare.com.au/products/daily-living-aids/assisted-living/glow-in-the-dark-light-switches/dementia-care-glowing-surround-for-light-switch/.

(Continued)

*Primary Examiner* — Zheng Song
*Assistant Examiner* — Glenn D Zimmerman
(74) *Attorney, Agent, or Firm* — Jacob M. Ward; Ward Law Office LLC

(57) ABSTRACT

The present disclosure provides a face plate for securing onto an electrical receptacle box, an electrical device recognition safety system, and a method of making a wall mounted electrical device safer and more easily identified. The face plate can include a plate body having an opening and a plurality of zones. The plurality of zone can surround the opening. The plurality of zones can include a first zone and the second zone. The first zone can have a visual contrast with the second zone.

15 Claims, 5 Drawing Sheets

(56) References Cited

U.S. PATENT DOCUMENTS

| | | | |
|---|---|---|---|
| 9,325,516 | B2 | 4/2016 | Pera et al. |
| 9,464,795 | B2 | 10/2016 | Ebeling |
| 9,742,111 | B2 | 8/2017 | Smith et al. |
| 9,882,361 | B2 | 1/2018 | Smith et al. |
| 10,404,045 | B2 | 9/2019 | Smith et al. |
| 10,505,326 | B2 | 12/2019 | Chien |
| 10,886,674 | B2 | 1/2021 | Diotte |
| 10,962,217 | B1 * | 3/2021 | Zepp .................. F21V 33/0028 |
| 11,011,901 | B2 | 5/2021 | Shotey |
| 11,063,396 | B2 | 7/2021 | Iaconis et al. |
| 2006/0267788 | A1 | 11/2006 | Delany |
| 2013/0032594 | A1 | 2/2013 | Smith |
| 2014/0133130 | A1 * | 5/2014 | Ebeling ............. H01R 13/6683 |
| | | | 315/159 |
| 2017/0264059 | A1 | 9/2017 | Cote |
| 2017/0294732 | A1 | 10/2017 | Monzaviyan |
| 2017/0322782 | A1 * | 11/2017 | Pakiman .................. G06F 8/33 |

OTHER PUBLICATIONS

Recogneyes Care Home and Dementia Signage, "Coloured Light Switch Covers", webpage, recogneyes.co.uk, SKU: REC53, United Kingdom, https://www.recogneyes.co.uk/product/coloured-light-switch-covers-2/.

Happy Jasta, "Light switch plates with glow in dark feature—Lumino GlowaSwitch", webpage, homecrux.com, https://www.homecrux.com/light-switch-plates-glow-dark-feature/49674/ 2023.

Elasco Products, "Glow in the Dark Safety 2-Gang Wall Cover Plate—White Plastic—Standard Size for Double Toggle Light Switch (Single Pack)", webpage, cableprotectorworks.com, SKU: VIVCPL2GN, US, https://www.cableprotectorworks.com/product/glow-in-the-dark-safety-2-gang-wall-cover-plate-white-plastic-standard-size-for-double-toggle-light-switch-single-pack/ 2023.

Written Opinion of the International Searching Authority dated Jan. 4, 2024.

* cited by examiner

ENHANCED CONTRAST FACE PLATE SYSTEM, KIT, AND METHOD

CROSS-REFERENCE TO RELATED APPLICATIONS

This application claims the benefit of U.S. Provisional Application No. 63/390,771, filed on Jul. 20, 2022. The entire disclosure of the above application is incorporated herein by reference.

FIELD

The present technology relates to face plates and, more particularly, a system, kit, and method of making a wall mounted electrical device safer and more easily identified.

INTRODUCTION

This section provides background information related to the present disclosure which is not necessarily prior art.

Assisted living facilities commonly provide housing for elderly and disabled individuals. Residents of assisted living facilities may have mobility issues, cognitive decline, such as dementia, or be visually impaired. These facilities allow for residents to care for themselves with assistance in certain areas of life such as laundry, bathing, meal preparation, and medical management. However, because residents are not monitored around the clock, accidents such as falls, commonly occur. Frequently, residents with low vision fall because the resident is unable to find a light switch and will continue to walk around a room until they find the light switch. Similarly, residents who have dementia fall because the resident lacks the problem-solving skills to search for the light switch and may continue to walk around in a dark room. In both these scenarios, residents find themselves walking in a dark room and can very easily trip and fall.

One method that assisted living facilities and, specifically, occupational therapists, use to reduce the risk of falling is adding contrast to a resident's room. The first areas that are contrasted are the light switches. Currently, occupational therapists address this low-contrast, low vision issue by manually outlining each face plate with black electrical tape. The addition of the black tape to the white face plate creates enough visual contrast for the resident to see the location of the light switch on the wall.

Although the above-described method is useful, it requires the occupational therapist to spend a lot of time cutting electrical tape to the dimensions of the light switch plate and applying it to every light switch in a resident's apartment and the common areas of the assisted living facility. Furthermore, it can also be helpful to add contrast to electrical outlets to allow residents to easily plug devices in, which requires an even greater time investment.

Electrical tape is used due to its ability to be easily removed. However, this feature of electrical tape can frequently result in the tape peeling away from a surface over time. Once the tape peels away or falls off completely, it needs to be replaced, and if it cannot be replaced right away, the risk of falls is increased until the contrast is reestablished. Conversely, if the electrical tape is applied to a face plate that is commonly in the sunlight, the adhesive on the tape may become sticky and leave a residue when removed. This residue needs to be cleaned before new tape can be applied. As such, using and replacing electrical tape requires additional materials, maintenance, and time.

Accordingly, there is a continuing need for a face plate that has an integral visually contrasting zones, in which the face plate provides a stable and continuous visual contrast that negates the need for maintenance and replacement. Desirably, the face plate with the visual contrast contained on and within the face plate creates a visual contrast upon installation and saves time.

SUMMARY

In concordance with the instant disclosure, a face plate that has visually contrasted zones for aiding identification of an electrical device, such as a light switch or outlet, has surprisingly been discovered.

The present disclosure provides a face plate for securing onto an electrical receptacle box. The face plate can include a plate body having an opening and a plurality of zones. The plurality of zone can surround the opening. The plurality of zones can include a first zone and the second zone. The first zone can have a visual contrast with the second zone.

The present disclosure further provides an electrical device recognition safety system. The system can include an electrical receptacle box, an electrical device, and a face plate for securing onto an electrical receptacle box. The face plate can include a plate body having an opening and a plurality of zones. The plurality of zone can surround the opening. The plurality of zones can include a first zone and the second zone. The first zone can have a visual contrast with the second zone.

The present disclosure further contemplates a method of making a wall mounted electrical device safer and more easily identified. An electrical receptacle box, an electrical device, and a face plate can be provided. The face plate can include a plate body having an opening and a plurality of zones. The plurality of zone can surround the opening. The plurality of zones can include a first zone and the second zone. The first zone can have a visual contrast with the second zone. The electrical device can be placed into the electrical receptacle box and secured within the electrical receptacle box. The face plate can be placed on the electrical receptacle box and secured to the electrical receptacle box.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
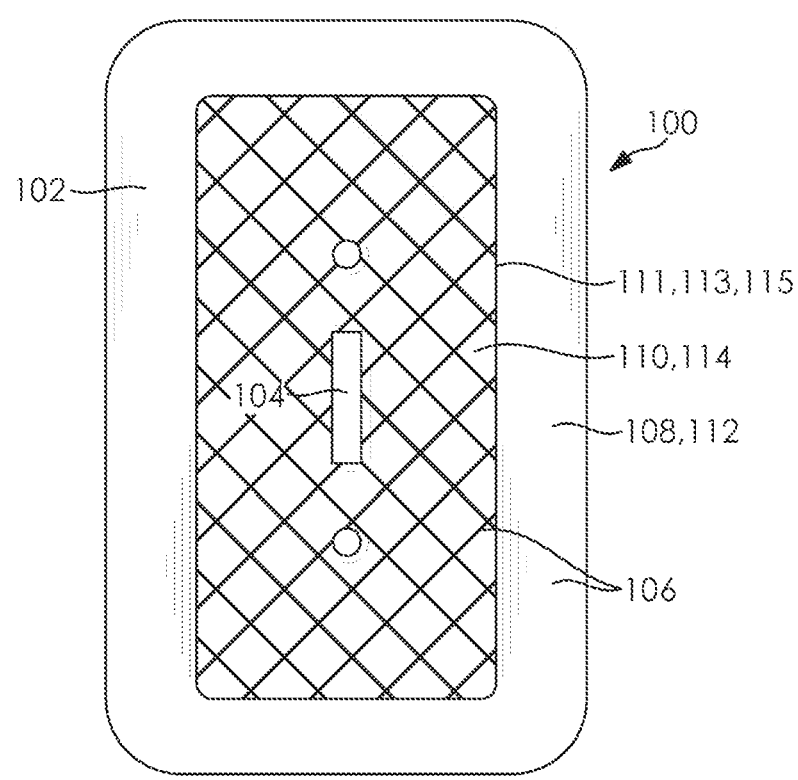
FIG. 1 is a front elevational view of an embodiment of a face plate for a light switch having a first zone and a second zone.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to a face plate 100, electrical device recognition safety system 200, an electrical device recognition safety kit 300, and method 400 of making a wall mounted electrical device safer and more easily identified, shown generically in FIGS. 1-7. Advantageously, the face plate 100 and its use on an electrical receptacle box 101 allows for a generic electric device 103, such as an electrical outlet 105, light switch 107 or on/off switch 109, to be more easily visible. As such, the face plate 100 can provide a safety advantage for the elderly and those with low vision by making the face plate more visible on a wall.

Figure 6:
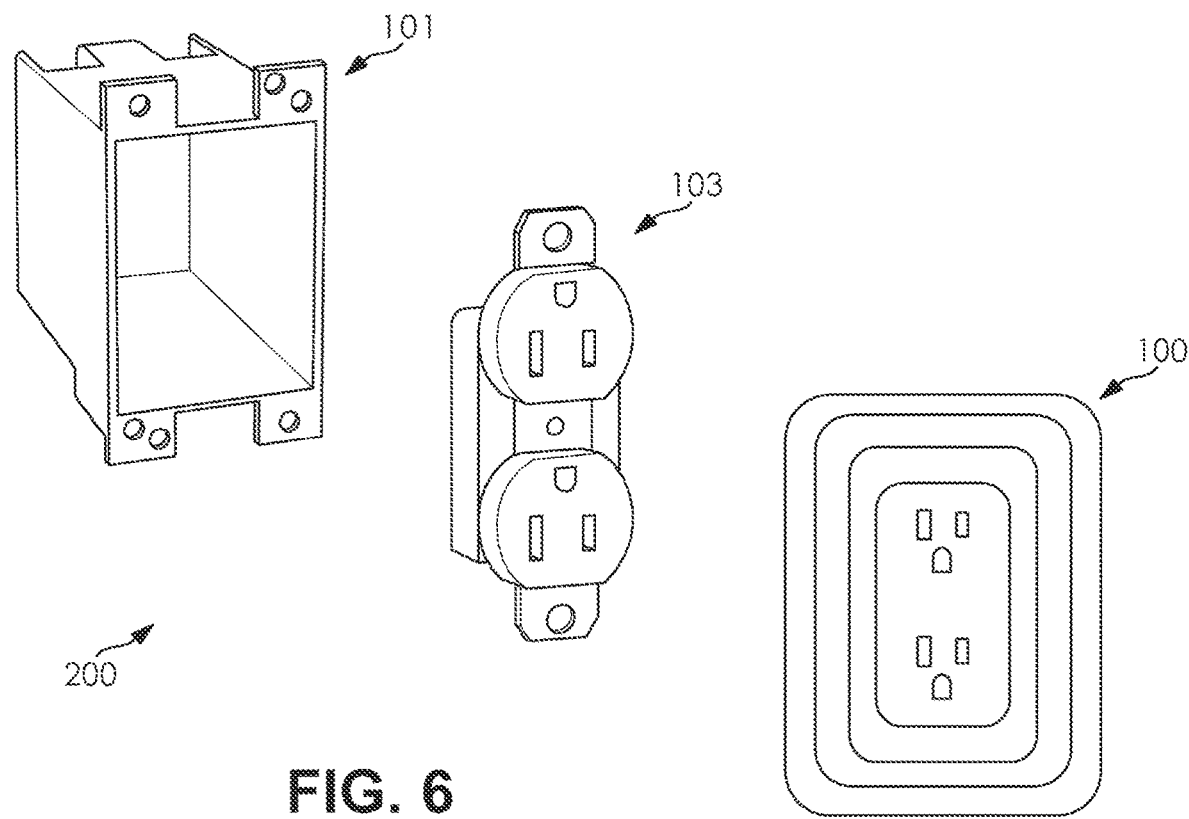
FIG. 6 is an exploded view of an embodiment of an electrical device recognition safety system.
Figure 7:
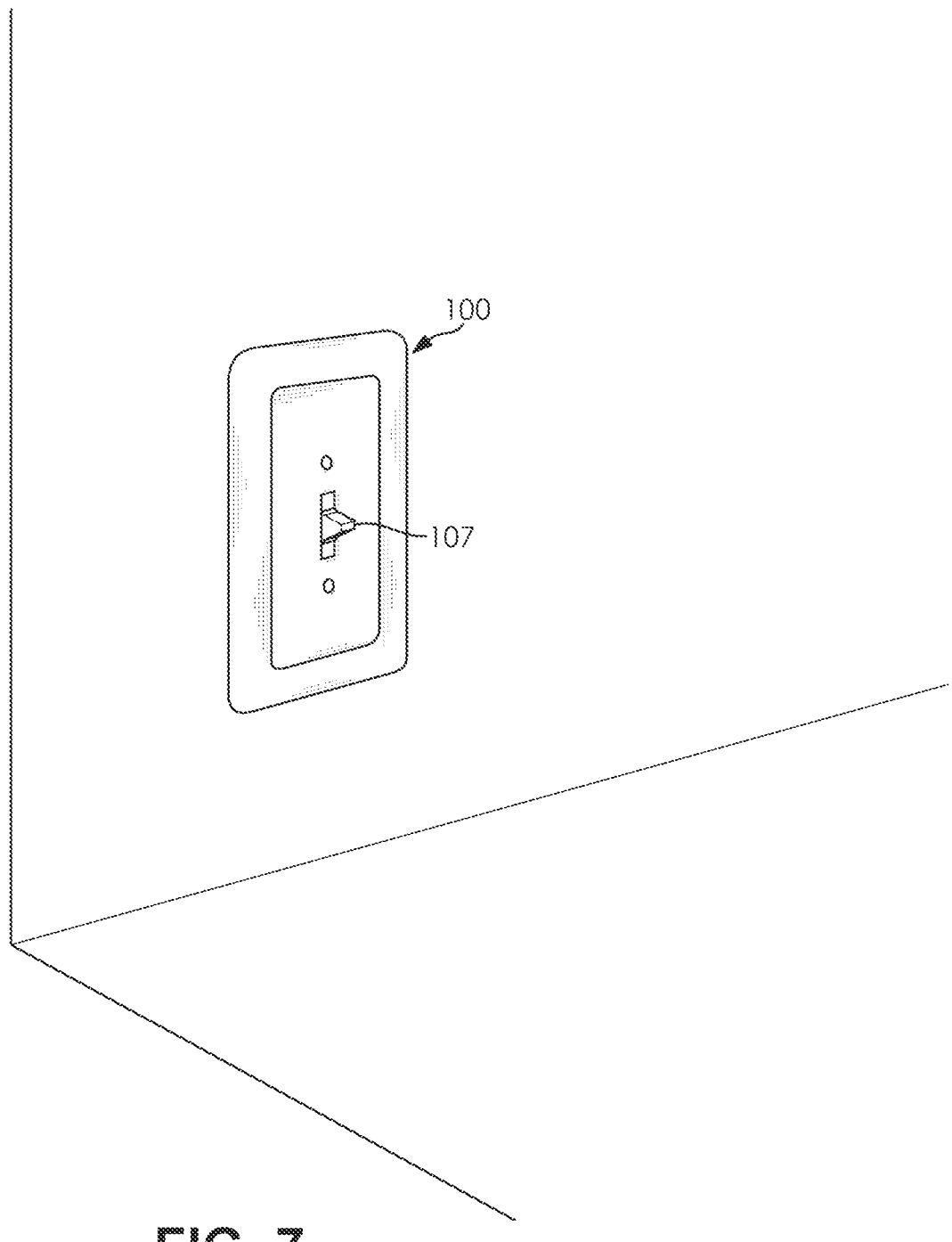
FIG. 7 is an environmental view of an embodiment of a face plate secured to a light switch and installed on a wall.
Figure 8:
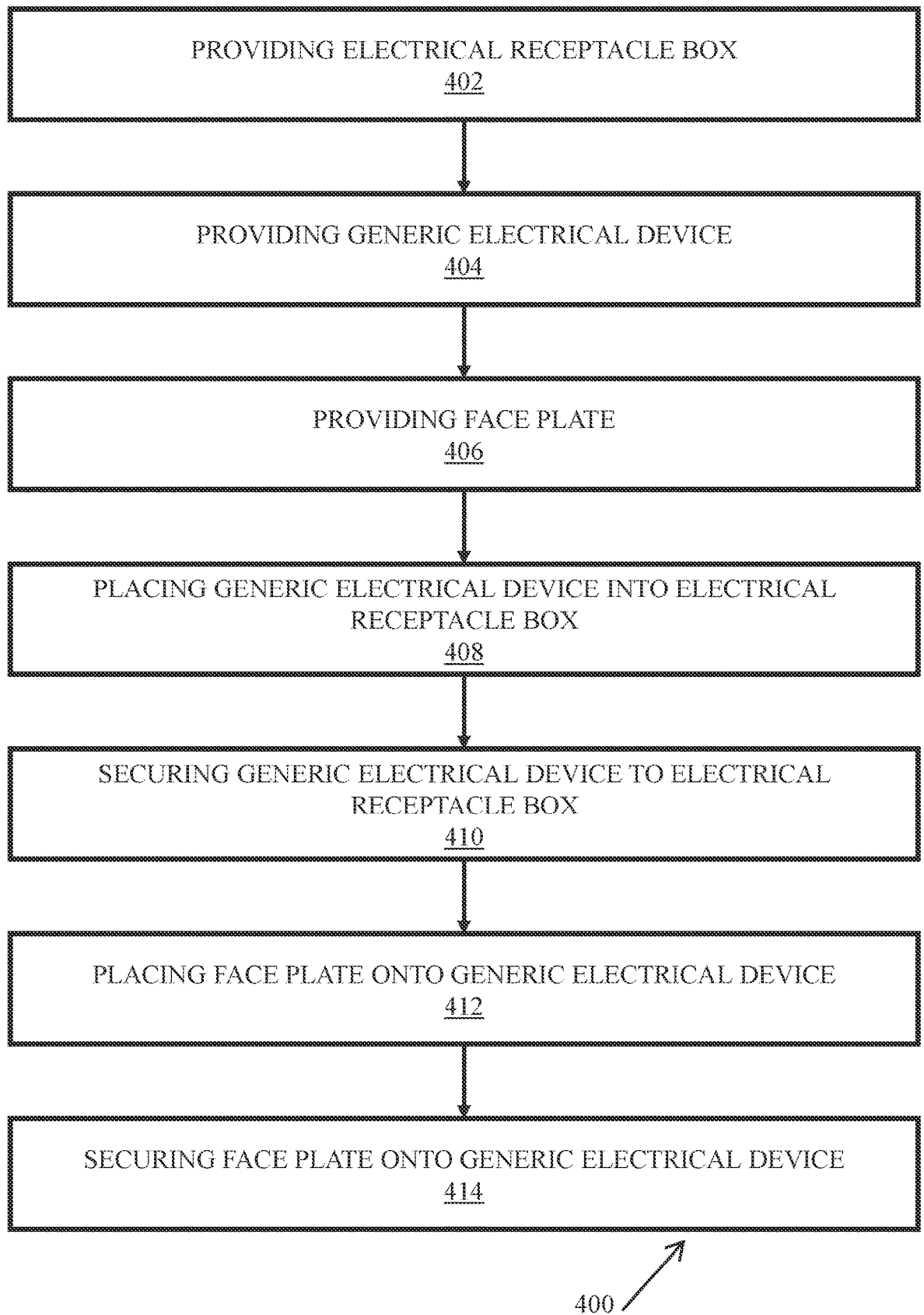
FIG. 8 is a flowchart depicting an embodiment of a method of making a wall mounted electrical device safer and more easily identified.

As shown in FIG. 6, the face plate 100 can be secured onto an electrical receptacle box 101. With reference to FIG. 1, the face plate 100 can include a plate body 102 having an opening 104 and a plurality of zones 106 that surround the opening 104. The opening 104 can be configured to provide access to a portion of the electrical device 103. The plurality of zones 106 can include a first zone 108 and a second zone 110. The first zone 108 can have a first visual contrast with the second zone 110. As used herein, the terms "visual contrast" and "contrasting" can be defined as meaning the state of being strikingly different from something else in juxtaposition or close association, or the use of opposing elements, such as colors, forms, or lines, in proximity to produce an intensified effect in visual appearance. To this point, the first zone 108 and the second zone 110 can have an interface 111 where an inner perimeter 113 of the first zone 108 and an outer perimeter 115 of the second zone 110 meet and are the same in shape and dimension. The interface 111 can create a distinction between the first zone 108 and the second zone 110. The distinction can be a feature of the visual contrast. The visual contrast can be defined by an inherent value associated with the mode of contrast selected, for example, color or lighting intensity.

It should be appreciated that where the mode of visual contrast is color, the inherent value employed to define the contrast is a color contrast ratio. For example, the color contrast ratio can have a value equal to or greater than 4:1 in at least a few instances, equal to or greater than 5.5:1 in at least some instances, and equal to or greater than 7:1 in most instances. The color intensity contrast ratio can be determined by comparing the relative luminance of the lighter color to the relative luminance of the darker color.

It should also be appreciated that where the mode of visual contrast is lighting intensity, the inherent value employed to define the contrast is a lighting intensity contrast ratio. For example, the lighting intensity contrast ratio can have a value equal to or greater than 2:1 in at least a few embodiments, equal to or greater than 3:1 in at least some embodiments, and equal to or greater than 4:1 in most embodiments. The light intensity contrast ratio can be determined by comparing the lumens of the higher lighting intensity to the lumens of the lower lighting intensity.

With reference to FIG. 1-5 and as explained hereinabove, the first visual contrast between the first zone 108 and the second zone 110 can be created by a difference in color, a difference in lighting, a difference in both color and lighting, or any difference that could be selected by a skilled artisan within the scope of the present disclosure, each shown in FIGS. 1-4 where a difference in color is depicted in FIG. 1 with the first zone 108 having no crosshatching and the second zone 1120 having cross hatching. For example, the first zone 108 can include a first color 112 and the second zone 110 can include a second color 114, depicted in FIG. 1 by crosshatching. The first color 112 and the second color 114 can be different such that a first visual contrast is created when the first color 112 and the second color 114 are disposed adjacent to one another on the face plate 100. A skilled artisan can select a suitable color for the first color 112 and the second color 114 such that there is contrast. Additionally, the first color 112 and the second color 114 can be selected to contrast with the color of the wall on which the face plate 100 is installed.

Figure 2:
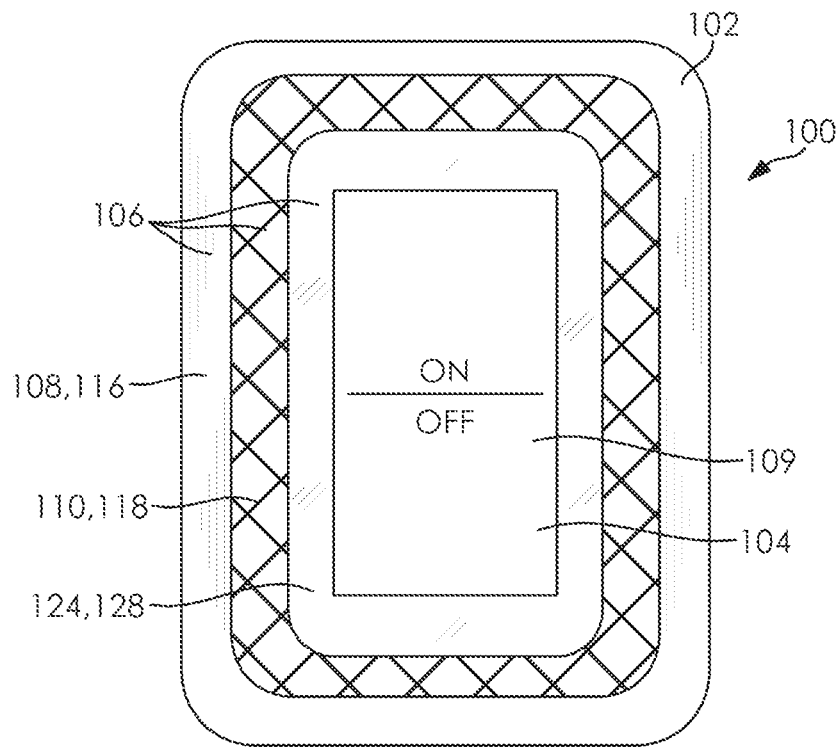
FIG. 2 is a front elevational view of an embodiment of a face plate for an on/off switch having a first zone, a second zone, and a third zone.

As a further example and with continued reference to FIG. 2, the first visual contrast between the first zone 108 and the second zone 110 can be created by a difference in lighting intensity, depicted with crosshatching in FIG. 2. The first zone 108 can include a first lighting intensity 116 and the second zone 110 can include a second lighting intensity 118. The first lighting intensity 116 and the second lighting intensity 118 can be different such that the first visual contrast is created when the first lighting intensity 116 and the second lighting intensity 118 are disposed adjacent to one another on the face plate 100. Where there is a visual contrast created by lighting intensity, the lighting intensity can be supplied by an emanating light source 120. As a non-limiting example, the emanating light source 120 can be an LED light. A skilled artisan can select a suitable emanating light source 120 within the scope of the present disclosure. To this point, the plate body 102 can be formed from a translucent material 113, as shown in FIG. 5, to permit light from the emanating light source 120 to pass therethrough. Alternatively, and as shown in FIG. 4, the lighting intensity created by the emanating light source 120 can pass through the plate body 102 via an aperture 122 in the plate body 102.

Figure 4:
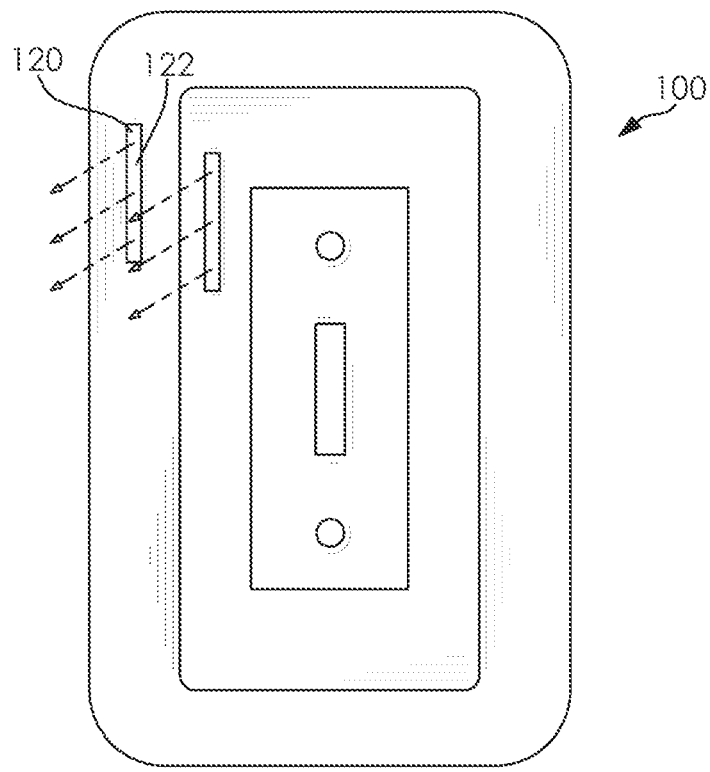
FIG. 4 is a front elevational view of an embodiment of a face plate having an aperture.
Figure 5:
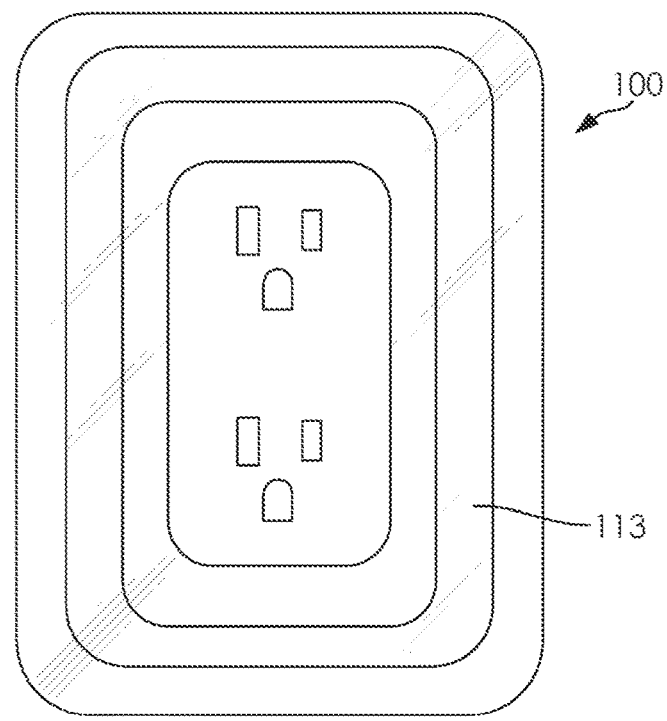
FIG. 5 is a front elevational view of an embodiment of a face plate formed of translucent material.

With continued reference to FIG. 4, the aperture 122 can be rectangular in shape. Alternatively, the aperture 122 can be circular, triangular, hexagonal, or any shape that can be confined within a perimeter of one zone of the plurality of zones 106. The aperture 122 can also be any size such that the aperture 122 is confined within the perimeter of one zone of the plurality of zones 106. A skilled artisan can select any suitable shape and size for the aperture 122 within the scope of the present disclosure. Additionally, the face plate 100 can include several apertures 122 within one zone of the plurality of zones 106. Further, the first zone 108, the second zone 110, and any additional zone within the plurality of zones 106 can all include apertures 122 configured to allow for light created by the emanating light source 120 to pass through the plate body 102.

Alternatively, the lighting intensity can be supplied by a luminescent material disposed on or in the plate body 102. For example, the first zone 108 and the second zone 110 can be formed of the luminescent material with the concentration of the luminescent material in the first zone 108 differing from the concentration of the luminescent material in the second zone 110 to create visual contrast. In an alternative embodiment, the luminescent material can be disposed on the surface of the first zone 108 and the second zone 110 in different concentrations to create the first visual contrast. A skilled artisan can select a suitable concentration of luminescent material for the first zone 108 and the second zone 110 within the scope of the present disclosure. It should also be appreciated that the luminescence can be, but is not limited to, fluorescence, photoluminescence, electroluminescence, and phosphorescence. A skilled artisan can select a suitable form of luminescence within the scope of the present disclosure.

Figure 3:
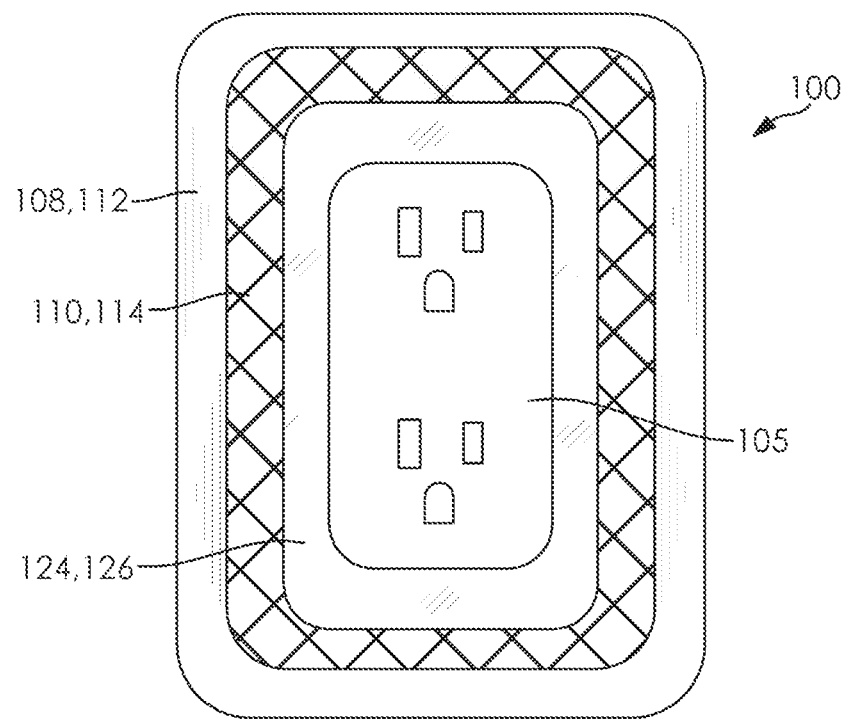
FIG. 3 is a front elevational view of an embodiment of a face plate for an electrical receptacle.

As shown in FIGS. 2-3, the plurality of zones 106 can include a third zone 124. The third zone 124 can have a second visual contrast with the second zone 110. The visual difference between the second zone 110 and the third zone 124 can be created by a difference in color where the third zone 124 is a third color 126, shown in FIG. 3. In certain embodiments, the first color 112 and the third color 126 can be the same and the second color 114 can be different from the first color 112 and the third color 126, shown with crosshatching in FIG. 3. Alternatively, the first color 112, the second color 114, and the third color 126 can all be different colors. Further, the first color 112, the second color 114, and the third color 126 can be the same color but vary in intensity or hue such that a visual contrast is created. It should be noted that the first color 112, the second color 114, and the third color 126 can be selected to contrast with the color of the wall the face plate 100 is installed upon.

As a further example, and with continued reference to FIG. 2, the visual difference between the second zone 110 and the third zone 124 can be created by a difference in lighting intensity where the third zone 124 is a third lighting intensity 128. In certain embodiments, the first lighting intensity 116 and the third lighting intensity 128 can be the same and the second lighting intensity 118 can be different from the first lighting intensity 116 and the third lighting intensity 128, shown with crosshatching in FIG. 2. Alternatively, the first lighting intensity 116, the second lighting intensity 118, and the third lighting intensity 128 can all be different lighting intensities. Further, the first lighting intensity 116, the second lighting intensity 118, and the third lighting intensity 128 can be the same lighting intensity but vary in brightness, saturation, or hue temperature such that a visual contrast is created.

The face plate 100 can be any shape that fits over an electrical receptacle box 101. As non-limiting examples, the face plate 100 can be a rectangle, as shown in FIGS. 1-7, or other shapes including an "X" shape, a circle, or a triangle. A skilled artisan can select a shape for the face plate 100 within the scope of the present disclosure. Advantageously, the shape of the face plate 100 can signify as an identifier as to the type of generic electric device 103 in use. As a non-limiting example, a rectangular face plate 100 could signify a light switch 107 and an oval face plate 100 could signify an electrical outlet 105. Further, the first zone 108 and the second zone 110 can be any shape such that the interface 111 between the first zone 108 and the second zone 110 are substantially the same.

The face plate 100 can be formed from any rigid material such as plastic, polyvinyl chloride (PVC), polycarbonate, nylon plastic, metal, wood, and composite material. A skilled artisan can select a suitable material for the face plate 100 within the scope of the present disclosure.

The present disclosure also contemplates an electrical device recognition safety system 200. The system 200 can include an electrical receptacle box 101, a electrical device 103, and a face plate 100 as described hereinabove. The face plate 100 can be configured to be secured over the electrical receptacle box 101. Additionally, the face plate 100 can be configured to be secured to the electrical device 103 via a fastening means such as a screw, adhesive, or a snap. Advantageously, the face plate 100 can be installed upon or secured to a standard electrical receptable box 101 or electrical device 103 to allow for the face plate 100 to be retrofit to any electrical receptacle box 101 and/or electrical device 103 that is already installed. Desirably, additional installation is not required beyond securing the face plate 100 over the electrical receptacle box 101 or to the electrical device 103.

The present disclosure contemplates an electrical device recognition safety kit. The safety kit can include a face plate 100, as described hereinabove, and a fastening means. As described above, the fastening means can be configured to secure the plate body 102 over the electrical receptacle box 101 and can include, but is not limited to, a screw, adhesive, or a snap. Advantageously, the safety kit can allow for a user to purchase the face plate 100 and fastening means to retrofit the face plate 100 onto a previously installed electrical receptacle box 101 or electrical device 103.

The present disclosure further contemplates a method 400 for making a wall mounted electrical device safer and more easily identified. In a step 402, an electrical receptable box 101 can be provided. An electrical device 103 can be provided in a step 404. The electrical device 103 can include an electrical outlet 105, a light switch 107, or an on/off switch 109, as described hereinabove. A skilled artisan can select a suitable electrical device 103 within the scope of the present disclosure. In a step 406, a face plate 100 described hereinabove can be provided. The face plate 100 can include a plate body 102 having an opening 104 and plurality of zones 106 surrounding the opening including a first zone 108 and a second zone 110. The electrical device 103 can be placed into the electrical receptacle box 101 in a step 408. In a step 410, the electrical device 103 can be secured to or within the electrical receptacle box 101. The electrical device 103 can be secured using a fastener such as a screw. The face plate 100 can be coupled or placed onto the electrical device 103 in a step 412, where the electrical device 103 can include a wall mounted electrical device. In a step 414, the face plate 100 can be secured to the electrical device 103 using a fastener such as a screw. Where the face plate is installed, the electrical device 103 has been made safer and more easily identified.

Advantageously, the face plate 100, the electrical device recognition safety system 200, the electrical device recognition safety kit 300, and the method 400 of making a wall mounted electrical device 103 safer and more easily identified described hereinabove can allow the user to easily identify where an electrical outlet 105 or light switch 107 is located on a wall. Desirably, this allows the user, particularly users with dementia or who are visually impaired, to live in a safer environment by being able to quickly and easily identify where an electrical outlet 105 or light switch 107 is located.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A face plate for securing over an electrical device disposed within an electrical receptacle box, comprising:
   a plate body having an opening and a plurality of zones surrounding the opening, the opening configured to provide access to a portion of the electrical device,
   the plurality of zones including a first zone and a second zone,
      the first zone having a first color and a first aperture through which a first light is emitted, the first color, the first aperture, and the first light together providing first visual appearance,
      the second zone having a second color and a second aperture through which a second light is emitted, the second color, the second aperture, and the second light together providing a second visual appearance,
   a first visual contrast created by a difference in the first visual appearance of the first zone and the second visual appearance of the second zone, and wherein the first visual contrast includes a first color contrast between the first visual appearance and the second visual appearance, the first color contrast having a color contrast ratio of at least 4:1, wherein the first visual contrast includes a first lighting intensity contrast between the first light emitted through the first aperture and the second light emitted through the second aperture, the first lighting intensity contrast having a lighting intensity contrast ratio of at least 2:1, wherein the first light and the second light are a same color, and wherein the first aperture is confined entirely within a first perimeter of the first zone and the second aperture is confined entirely within a second perimeter of the second zone.

2. The face plate of claim 1, wherein the plate body is formed from a translucent material.

3. The face plate of claim 1, further comprising a luminescent material disposed on the plate body.

4. The face plate of claim 1, wherein the lighting intensity is supplied by emanating light sources disposed adjacent the plate body.

5. The face plate of claim 1, wherein the plurality of zones includes a third zone having a second visual contrast with the second zone.

6. The face plate of claim 5, wherein the second visual contrast is created by a difference in color.

7. The face plate of claim 5, wherein the second visual contrast is created by a difference in lighting intensity.

8. The face plate of claim 1, wherein an inner perimeter of the first zone and an outer perimeter of the second zone are the same shape.

9. The face plate of claim 5, wherein the second visual contrast is created by a difference in both color and lighting intensity, the third zone has a third color and a third aperture through which a third light is emitted, the third color, the third aperture, and the third light together providing a third visual appearance that is different from the second visual appearance.

10. An electrical device recognition safety system, comprising:
an electrical device; and
a face plate including
a plate body having an opening and a plurality of zones surrounding the opening, the opening configured to provide access to a portion of the electrical device,
the plurality of zones including a first zone and a second zone,
the first zone having a first color and a first aperture through which a first light is emitted, the first color, the first aperture, and the first light together providing first visual appearance,
the second zone having a second color and a second aperture through which a second light is emitted, the second color, the second aperture, and the second light together providing a second visual appearance,
a first visual contrast created by a difference in the first visual appearance of the first zone and the second visual appearance of the second zone, and
wherein the first visual contrast includes a first color contrast between the first visual appearance and the second visual appearance, the first color contrast having a color contrast ratio of at least 4:1,
wherein the first visual contrast includes a first lighting intensity contrast between the first light emitted through the first aperture and the second light emitted through the second aperture, the first lighting intensity contrast having a lighting intensity contrast ratio of at least 2:1,
wherein the first light and the second light are a same color, and
wherein the first aperture is confined entirely within a first perimeter of the first zone and the second aperture is confined entirely within a second perimeter of the second zone.

11. The electrical device recognition safety system of claim 10, wherein the electrical device is a light switch.

12. The electrical device recognition safety system of claim 10, wherein the electrical device is an electrical outlet.

13. A method of making an electrical device disposed within an electrical receptacle box safer and more easily identified, the method comprising steps of:
coupling a face plate to the electrical device,
the face plate including
a plate body having an opening and a plurality of zones surrounding the opening, the opening configured to provide access to a portion of the electrical device,
the plurality of zones including a first zone and a second zone,
the first zone having a first color and a first aperture through which a first light is emitted, the first color, the first aperture, and the first light together providing first visual appearance,
the second zone having a second color and a second aperture through which a second light is emitted, the second color, the second aperture, and the second light together providing a second visual appearance,
a first visual contrast created by a difference in the first visual appearance of the first zone and the second visual appearance of the second zone, and
wherein the first visual contrast includes a first color contrast between the first visual appearance and the second visual appearance, the first color contrast having a color contrast ratio of at least 4:1,
wherein the first visual contrast includes a first lighting intensity contrast between the first light emitted through the first aperture and the second light emitted through the second aperture, the first lighting intensity contrast having a lighting intensity contrast ratio of at least 2:1,
wherein the first light and the second light are a same color, and
wherein the first aperture is confined entirely within a first perimeter of the first zone and the second aperture is confined entirely within a second perimeter of the second zone.

14. The method of claim 13, wherein the electrical device is a light switch.

15. The method of claim 13, wherein the electrical device is an electrical outlet.

* * * * *